(12) United States Patent
Frosien

(10) Patent No.: US 7,947,953 B2
(45) Date of Patent: May 24, 2011

(54) CHARGED PARTICLE DETECTION APPARATUS AND DETECTION METHOD

(75) Inventor: Juergen Frosien, Riemerling (DE)

(73) Assignee: ICT Integrated Circuit Testing Gesellschaft für Halbleiterprüftechnik mbH, Heimstetten (DE)

( * ) Notice: Subject to any disclaimer, the term of this patent is extended or adjusted under 35 U.S.C. 154(b) by 311 days.

(21) Appl. No.: 12/247,849

(22) Filed: Oct. 8, 2008

(65) Prior Publication Data

US 2010/0084553 A1 Apr. 8, 2010

(51) Int. Cl.
*H01J 37/00* (2006.01)
*H01J 37/244* (2006.01)
*G01N 23/00* (2006.01)

(52) U.S. Cl. .......................... 250/309; 250/311

(58) Field of Classification Search .............. 250/309, 250/311
See application file for complete search history.

(56) References Cited

U.S. PATENT DOCUMENTS

| | | | |
|---|---|---|---|
| 4,841,143 A * | 6/1989 | Tamura et al. | 250/288 |
| 4,902,967 A | 2/1990 | Flesner | |
| 6,396,299 B1 | 5/2002 | Hayashida | |
| 2002/0170675 A1 * | 11/2002 | Libby et al. | 156/345.39 |
| 2003/0213893 A1 | 11/2003 | Ichirota et al. | |
| 2004/0124356 A1 | 7/2004 | Scholtz et al. | |

FOREIGN PATENT DOCUMENTS

| | | |
|---|---|---|
| EP | 0985141 | 3/2000 |
| JP | 01 292736 | 11/1989 |
| JP | 06096712 | 4/1994 |
| JP | 09264858 | 10/1997 |
| JP | 2002117798 | 4/2002 |

OTHER PUBLICATIONS

International Search Report. Sep. 8, 2007.
International Search Report. Nov. 27, 2008.
European Search Report and Written Opinion dated Mar. 27, 2009, European Application No. 08166151.4.

* cited by examiner

*Primary Examiner* — David A Vanore
(74) *Attorney, Agent, or Firm* — Patterson & Sheridan, L.L.P.

(57) ABSTRACT

A detection apparatus for use in a charged particle beam device is provided. The detection apparatus includes a separation field generating portion adapted to generate a separation field separating positively and negatively charged secondary particles, at least one first detector for detecting positively charged particles, at least one second detector for detecting negatively charged particles, wherein the detection apparatus is adapted to simultaneously detect the positively charged secondary particles in the at least one first detector and the negatively charged secondary particles in the at least one second detector. Further, a method of simultaneously detecting negatively and positively charged particles is provided. The method includes providing a separation field, providing at least one first detector and at least one second detector, separating the negatively charged particles from the positively charged particles in the separation field, simultaneously detecting positively charged particles with the at least one first detector and negatively charged particles with the at least one second detector.

23 Claims, 6 Drawing Sheets

CHARGED PARTICLE DETECTION APPARATUS AND DETECTION METHOD

FIELD OF THE INVENTION

Embodiments relate to a detection apparatus, in particular to a detection apparatus for use in a charged particle beam device, typically for inspection or imaging of samples. Embodiments also relate to a charged particle beam device including a detection apparatus. Moreover, embodiments relate to a method of detecting charged particles and a method of inspecting or imaging a sample.

BACKGROUND OF THE INVENTION

Detection apparatuses are used in a plurality of industrial fields. In particular, detection apparatuses included in charged particle beam devices are used for inspection or imaging of samples, e.g., of semiconductor devices.

In general, there is a high demand for inspecting samples or specimens within the micrometer or nanometer scale. On such a small scale, inspection or imaging is often done with charged particle beams, e.g. primary ion beams, which are generated in charged particle beam devices such as charged ion beam devices. Charged particle beams offer superior spatial resolution compared to, e.g., photon beams due to their short wavelengths.

Primary charged particle beams can generate, upon impingement on the sample or specimen, secondary charged particles, e.g. secondary electrons or secondary ions, which carry information about the sample or specimen. In particular, such secondary particles carry information about surface structures of the sample or specimen.

Negatively charged secondary particles or positively charged secondary particles can be detected with a detector, e.g., a scintillation detector, and the detector signals can be used for extracting information about the sample or specimen. In particular, the information can be used for inspecting the sample or imaging the sample.

Many imaging devices use secondary electrons to obtain information about the surface. Some imaging devices use secondary ions for this purpose. Still, there is a need for detection apparatuses that can obtain information for enhanced inspection or imaging applications.

SUMMARY OF THE INVENTION

In light of the above, a detection apparatus for use in a charged particle beam device and for simultaneous detection of negatively and positively charged particles according to independent claim 1 is provided and a method of simultaneously detecting negatively and positively charged particles according to independent claim 12.

According to one embodiment, a detection apparatus is provided for use in a charged particle beam device and for simultaneous detection of negatively and positively charged particles. The detection apparatus includes a separation field generating portion adapted to generate a separation field separating positively and negatively charged secondary particles, at least one first detector for detecting positively charged particles, at least one second detector for detecting negatively charged particles, wherein the detection apparatus is adapted to simultaneously detect the positively charged secondary particles in the at least one first detector and the negatively charged secondary particles in the at least one second detector.

According to another embodiment, a method is provided for simultaneously detecting negatively and positively charged particles in a charged particle beam application. The method includes providing a separation field, providing at least one first detector and at least one second detector, separating the negatively charged particles from the positively charged particles in the separation field, simultaneously detecting positively charged particles with the at least one first detector and negatively charged particles with the at least one second detector.

Further advantages, features, aspects and details that can be combined with embodiments described herein are evident from the dependent claims, the description and the drawings.

Embodiments are also directed to methods of operating the disclosed detection apparatus. These method steps may be performed manually or automated, e.g. controlled by a computer programmed by appropriate software, by any combination of the two or in any other manner.

BRIEF DESCRIPTION OF THE DRAWINGS

So that the manner in which the above recited features can be understood in detail, a more particular description may be had by reference to embodiments. The accompanying drawings relate to embodiments and are described in the following.

DETAILED DESCRIPTION

Figure 1:
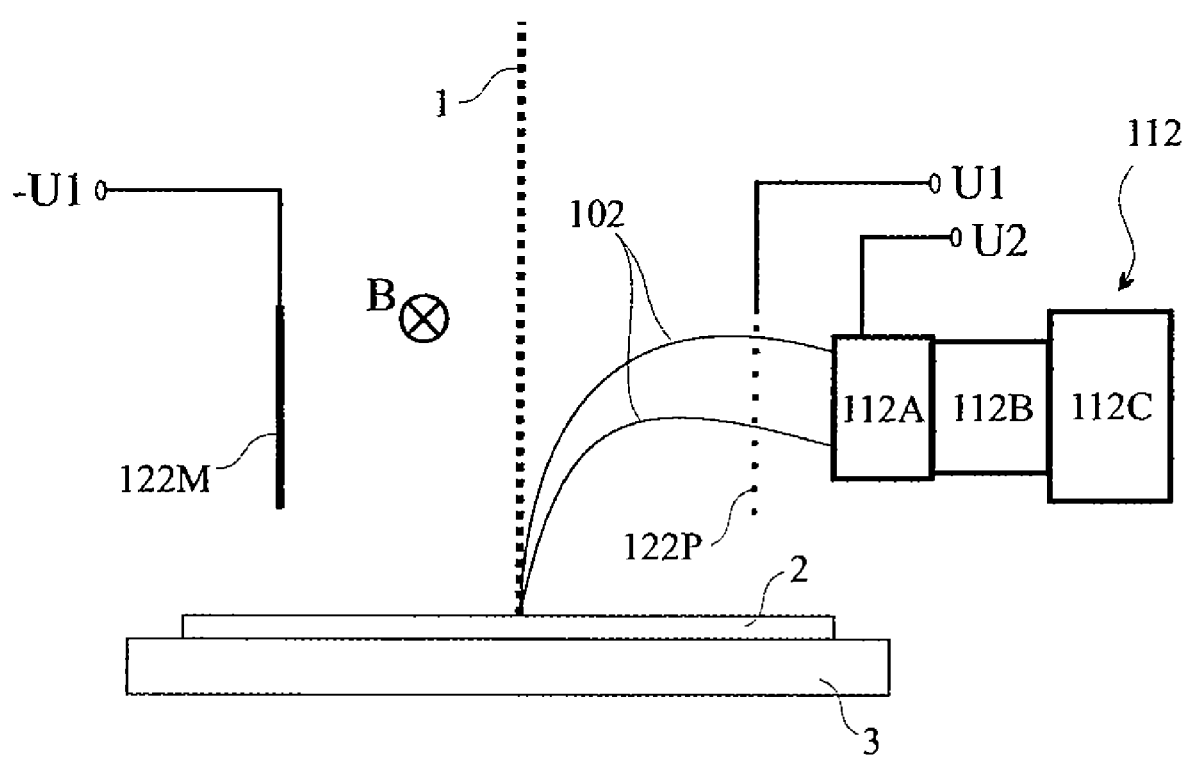
FIG. 1 shows a schematic side view of a part of a charged particle beam device as an exemplary device in which embodiments described herein can be used.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

Within the following description of the drawings, the same reference numbers refer to the same components. Further, reference numbers differing only in the first digit, which indicates the number of the referenced figure, refer to the same or similar components. Generally, only the differences with respect to the individual embodiments are described.

Secondary particles, as referred to herein, include any particles emitted upon impingement of one or more primary particles on a sample or specimen, typically primary particles from a primary particle beam. In particular, back-scattered particles are also included in the term "secondary particles".

The term "simultaneously detecting" as used herein refers to at least two detectors which are operating at the same time, each of them ready for detecting particles. Typically, a detector operates during a time interval, e.g. the time interval needed to inspect or image a sample. That means, a detector typically operates during a detection process, wherein a detection process is typically different from a detection event, i.e., the actual moment during which a particle hits a detector. According to embodiments, the term "simultaneously detecting" as used herein refers to at least one detection process taking place at one of the at least two detectors and at least one detection process taking place at the other one of the at least two detectors at the same time. Typically, "simultaneously detecting" refers to at least two detection processes taking place simultaneously over a time interval, typically during the whole method, e.g. for sample inspection or imaging. An apparatus, according to embodiments described herein, which is adapted to simultaneously detect may be adapted to simultaneously provide the detection result, e.g. in form of detector signals.

The term "unaltered" may include notions such as "undeflected" or "not reshaped", and these terms are used herein with respect to particle beams. All of these terms should be understood to allow for small alteration, deflection or reshaping, where "small" is to be understood in relation to certain characteristic beam parameters. Deviations which are at least one order of magnitude smaller than the characteristic beam parameter may be considered small. For example, if a beam is known to impinge a sample in a substantially circular original spot with diameter of 100 nm, the beam may be considered undeflected if the overlap of an impinged spot (of diameter 100 nm) with the original spot is at least 90%. Similarly, the beam may be considered not reshaped if the diameter of an impinged spot is from 90 nm to 110 nm.

FIG. 1 shows a part of a charged particle beam device as an example of a device in which embodiments described herein may be used. As shown in FIG. 1, a sample or specimen 2, e.g. a semiconductor wafer, is provided on a working plate 3. A primary charged particle beam 1 impinges on the sample 2 perpendicularly to the surface of the sample. Thereby, secondary charged particles such as secondary electrons or secondary ions are generated. These secondary charged particles are emitted into the hemisphere above the sample 2.

Further, a detection apparatus is provided. FIG. 1 shows an electrode 122M charged with a negative voltage −U1 and an electrode 122P charged with a positive voltage U1. The electrodes generate an electric field E between them, which acts on charged particles. The electric field E is substantially homogenous and points from the electrode 122P to the electrode 122M. Moreover, a magnetic field B is provided that points into the plane of drawing as indicated in FIG. 1 by the corresponding symbol. The magnetic field acts on moving charged particles. Coils and pole pieces or other means of generating such a magnetic field are not shown for simplification.

The combined electric and magnetic field are arranged in such a way as to let the primary charged particle beam pass the field without substantially changing its direction or shape.

While the primary beam is undeflected by the field, the secondary charged particles, having a velocity component in opposite direction to that of the impinging primary beam, are influenced by the fields. In particular, the secondary charged particles are deflected. FIG. 1 shows schematic, exemplary trajectories 102 of secondary electrons being deflected by both the electric and magnetic field towards the positive electrode 122P.

The positive electrode 122P is a grid electrode which is at least partially transparent to the secondary electrons. That means, at least part of the secondary electrons along their trajectories 102 can pass the electrode 122P. To the right of the electrode 122P in FIG. 1, i.e., behind the positively charged electrode 122P, as seen in the direction of the moving secondary electrons, a detector 112 is provided. The detector shown in FIG. 1 is a scintillation detector with scintillator 112A, light guide 112B and photomultiplier 112C. The detector 112 is biased with a second positive voltage U2 that is larger than the voltage U1. The electrode 122P shields the detector from the electric and magnetic field to the left of electrode 122P in FIG. 1. Vice versa, the electric field between the electrode 122P and the detector does not influence the charged particles to the left of the electrode 122P in FIG. 1.

The secondary electrons 102 which pass the electrode 122P are detected by the detector 112. The corresponding detector signals can deliver information about the sample 2. In particular, the signals may be used for inspecting or imaging of the sample 2.

However, positively charged secondary particles such as secondary ions, which carry additional information about the sample 2, are not detected in the embodiments of FIG. 1. One may try to reconfigure the detection apparatus shown in FIG. 1 to detect secondary ions, e.g., by exchanging the polarities of the biasing voltages, adjusting the electrical field E and the magnetic field B and, possibly, using a different suitable detector 112.

Even if information about the sample 2 from secondary ions can be obtained after reconfiguration of the detection apparatus of FIG. 1, a second scan of the sample 2 is required wasting time and other resources. Moreover, the positions scanned in such a second run need not coincide with the positions scanned in the first run, such that, most likely, there will not be a reliable correlation between the information gathered from the secondary electrons, the secondary ions, and the respective scanned sample positions. Here, "position" may mean an area such as the area impinged on by a primary particle beam.

According to embodiments described herein, means for improving the inspection or imaging of a sample are provided. Therein, information from both negatively charged secondary particles and positively charged secondary particles can be obtained simultaneously. Since the emission of secondary negatively and positively charged particles is statistical, the term "obtain information simultaneously", similarly as "simultaneously detecting", should not be misconstrued as being limited to an actual single detection event where at least two particles hit at least two detectors coincidentally. The information obtainable from both negatively charged secondary particles and positively charged secondary particles is larger than the information obtainable from either the negatively charged secondary particles or the positively charged particles individually. The increased information may help in the inspection or imaging of the sample. Additionally, there is substantially perfect correlation between information obtained from the two types of secondary particles and the position of the origin of the secondary particles, e.g., the position at which a primary charged particle beam impinges on a sample. The generation in parallel of a high degree of sample information and a high throughput image acquisition may be realized.

Generally, according to embodiments, which can be combined with any other embodiments disclosed herein, a primary particle beam or primary charged particle beam may be a focused particle beam. The beam diameter may range from 0.01 nm to 1 µm, typically from 0.05 nm to 100 nm, even more typically from 0.1 nm to 10 nm. Thereby, high resolution imaging or inspection with resolution in the sub-micron regime, typically nanometer regime or even sub-nanometer regime may be realized.

An origin of secondary charged particles may be the position or spot of impingement of a primary particle beam on a sample, typically a primary charged particle beam. In other embodiments, for some purposes such as testing or calibration, an origin of charged particles can be an electron emitter, ion emitter or combination thereof or can be of a different kind.

Figure 2A:
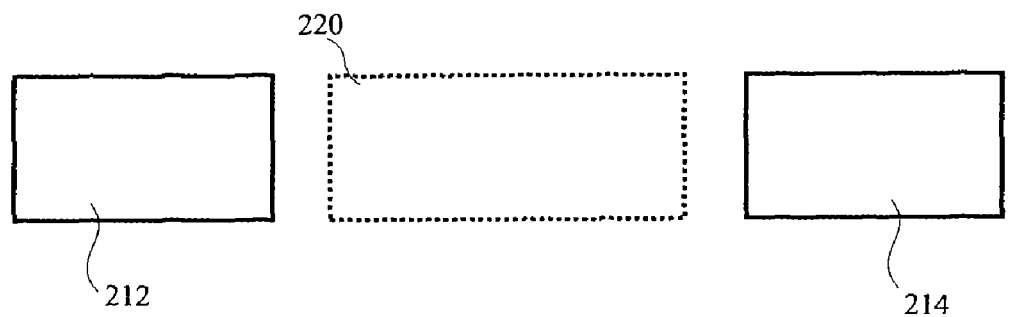
FIG. 2A shows a schematic side view of a detection apparatus according to embodiments described herein.

FIG. 2A shows a schematic side view of embodiments of a detection apparatus according to embodiments described herein. Typically a detection apparatus is a detection apparatus for use in a charged particle beam device. In some embodiments, a detection apparatus for use in a charged particle beam device and for the simultaneous detection of negatively and positively charged particles is provided. The negatively and positively charged particles may be secondary charged particles. Negatively and positively charged secondary particles may originate from a sample or sample surface.

The detection apparatus includes a first detector 212 and a second detector 214. The detection apparatus further includes a separation field generating device 220, representatively shown as a dotted rectangle in FIGS. 2A and 2B, respectively a dotted circle in FIG. 2C. The separation field generating device 220 generates a separation field 220F shown in FIG. 2C, which is a top view of the detection apparatus of FIG. 2B. The shape of the separation field generating device shown in FIGS. 2A, 2B, and 2C is only schematic.

The separation field generating device may, e.g., be a combination of electrodes for generating an electrical field and coils, possibly with pole pieces, for generating a magnetic field. The separation field generating device may be any other device adapted to generate a separation field for separating particles, typically charged particles, typically particles of opposite charge. The separation field may be a combination of an electrical and magnetic field, e.g. in a Wien filter arrangement, or may be any other field influencing particles, typically charged particles. The separation field generating device may be arranged as part of an apparatus for sample inspection.

Figure 2B:
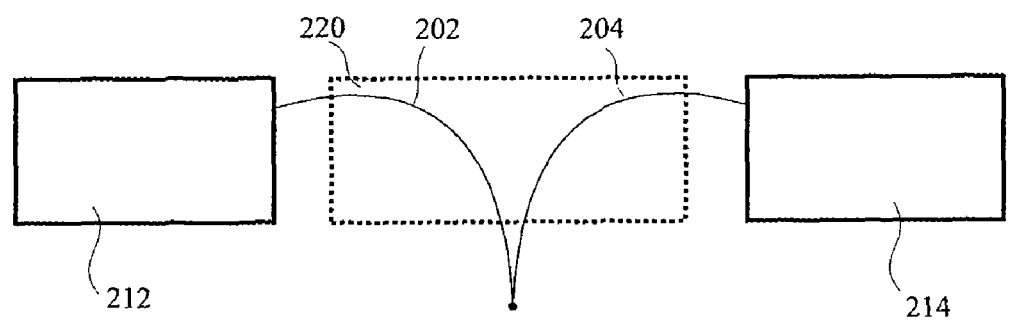
FIG. 2B shows a schematic side view of a detection apparatus according to embodiments described herein.
Figure 2C:
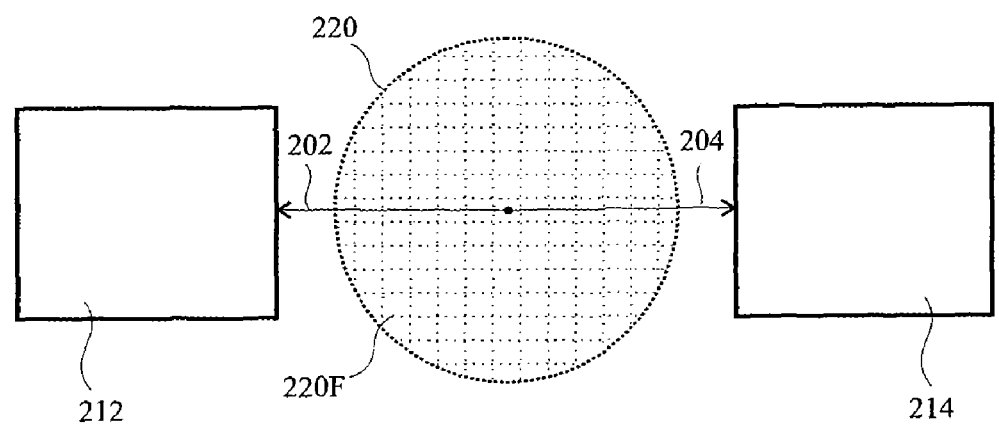
FIG. 2C shows a top view the detection apparatus of FIG. 2A according to embodiments described herein.

An exemplary schematic trajectory 202 of a positively charged particle, typically a positively charged secondary particle is shown in FIGS. 2B and 2C. An exemplary schematic trajectory 204 of a negatively charged particle, typically a negatively charged secondary particle is also shown. Typically, positively charged particles such as ions have a larger mass than negatively charged particles such as electrons. Typically, positively charged particles such as ions have smaller velocities than negatively charged particles such as electrons. The momentum of positively and negatively charged particles may be similar.

Generally, the separation field 220F separates positively charged particles, e.g. positively charged secondary particles such as secondary ions, from negatively charged particles, e.g. negatively charged secondary particles such as secondary electrons. Therein, according to some embodiments, the separation field deflects the positively charged particles towards the first detector 212 and the negatively charged particles towards the second detector 214. By spatial separation, the extraction of information from either type of charged particles is enabled. Directing charged particles to respective detectors prepares for a simultaneous extraction of such information.

According to embodiments described herein, the separation field 220F separates the positively and negatively charged particles. Typically, the detection apparatus simultaneously detects the positively charged particles in the first detector 212 and the negatively charged particles in the second detector 214. Enhanced information as compared to information gathered from only one type of charged particles may be obtained, improving effectiveness and imaging quality, and saving time and costs. A high efficiency dual charged particle beam detector or detection apparatus is provided, typically a high efficiency dual electron and ion beam detector or detection apparatus. Highly efficient parallel detection of secondary particles, such as secondary electrons and secondary ions, may be realized.

Generally, detectors according to embodiments, which can be combined with any other embodiments disclosed herein, may be any detectors for detecting charged particles, e.g., scintillation detectors, pin diodes, channeltrons, or channel plates. According to typical embodiments, such detectors are high efficiency detectors. Thereby, a good signal-to-noise ratio may be obtained. Moreover, several detectors used in a detection apparatus according to some embodiments, e.g., the first detector 212 and second detector 214, may be the same type of detector. Alternatively, such detectors may be of a different kind. In some embodiments, a detector of a detection apparatus has a biasing input, with which a biasing voltage can be applied to the detector. A biasing voltage, which may be individual for each detector used, may generally be from 1 V to 100 kV, typically from 1 kV to 20 kV, even more typically from 5 kV to 15 kV. The biasing voltage may have positive or negative polarity. In other embodiments, a detector has an output portion or signal output for transmitting signals or detector output, typically to an evaluation unit. A typical detector according to embodiments is a scintillation detector including a scintillator, a light guide and a photomultiplier.

According to embodiments, which can be combined with any of the embodiments described herein, the separation field generating device 220 includes an electrical field generating device or a magnetic field generating device or a combination thereof or any other field generating device influencing charged particles. Therefore, the generated separation field may be an electrical field, a magnetic field or a combination thereof, or any other field influencing charged particles.

Typically, an electrical field generating device includes at least two electrodes. Therein, at least one electrode is biased with a positive voltage and at least one electrode is biased with a negative voltage. Voltages that are applied can generally be in the range from 1 V to 10 kV, typically from 10 V to 1 kV, even more typically from 10 V to 500 V. At least two electrodes are penetrable for charged particles. Typically, at least one electrode of each bias is transparent or penetrable for charged particles. In some embodiments, at least one negatively biased electrode is penetrable for positively charged particles. According to some embodiments, at least one positively biased electrode is penetrable for negatively charged particles. The electrical field generated by the electrical field generating device may be the separation field 220F or may be at least part of the separation field 220F. The electrical field may, e.g., be a homogeneous field, a dipole field, a quadrupole field, octupole field, a field of higher multipole order or any other electrical field. The fields may also be substantially of the named types, i.e., small or local deformations are within the scope of such embodiments. Field strengths of such an electrical field generally depend on the applied voltages and may be adapted to comply with conditions such as, e.g., a Wien filter condition.

Further, typically, a magnetic field generating device includes at least two magnetic coils and, optionally, respective pole pieces. Alternatively, the magnetic field generating device includes any other means of providing at least one magnetic north pole and at least one magnetic south pole. The magnetic field generated by the magnetic field generating device may be the separation field 220F or may be at least part of the separation field 220F. The magnetic field may, e.g., be a homogeneous field, a dipole field, a quadrupole field, octupole field, a field of higher multipole order or any other magnetic field. The fields may also be substantially of the named types, i.e., small or local deformations are within the scope of such embodiments. Field strengths of such a magnetic field, i.e., the magnetic flux density, may be adapted to comply with conditions such as, e.g., a Wien filter condition. Field strengths of a magnetic field may be applied depending on the voltages applied to an electrical field generating device.

In some embodiments, the separation field includes an electrical field and a magnetic field or consists of an electrical field and a magnetic field. In further embodiments, this electrical and magnetic field are substantially orthogonal to each other, at least in a separation area. For orthogonal fields, a Wien condition may be imposed with respect to a charged particle beam having characteristics allowing the charged particle beam to pass the field unaltered, in particular undeflected and/or not reshaped. Alternatively, intended deviations from the Wien condition, e.g. in connection with tilted particle beams to be discussed later, may be easily imposed for such orthogonal fields. A Wien condition or intended deviation therefrom may reduce or eliminate unwanted beam deflection, astigmatism or other unwanted effects of the primary particle beam. The separation field generating device generating orthogonal electrical and magnetic fields with Wien condition may be a Wien filter.

According to embodiments, which may be combined with any other embodiments, the separation field generating device generates a separation field that lets a primary charged particle beam pass unaltered or undeflected. In such embodiments, typically, the primary charged particle beam impinges on some sample or specimen and thereby generates secondary charged particles. The secondary charged particles typically are negatively charged secondary particles and positively charged secondary particles such as secondary electrons and secondary ions.

Figure 3A:
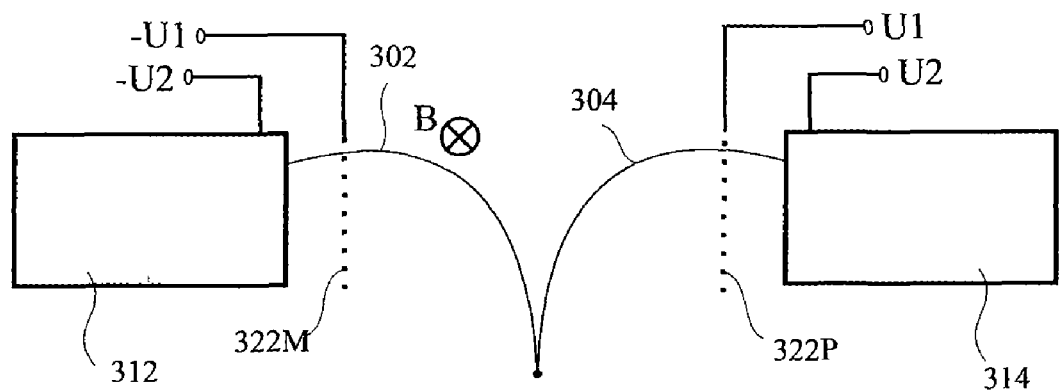
FIG. 3A shows a schematic side view of an embodiment of a detection apparatus according to embodiments described herein.

FIG. 3A shows a side view of embodiments described herein. Therein, a detection apparatus is provided. Typically the detection apparatus is a detection apparatus for use in a charged particle beam device. The detection apparatus includes a first detector 312 and a second detector 314. The detectors may be similar detectors, e.g., scintillation detectors or channel plate detectors. Alternatively, the detectors may be of a different kind. The detection apparatus further includes a first electrode 322M biased with a negative voltage −U1 and a second electrode 322P biased with a positive voltage U1. The two electrodes generate an electric field E that is substantially homogenous between the two electrodes and points from the second electrode to the first electrode. The detection apparatus further includes a magnetic field generating device, e.g., field coils with respective pole pieces (not shown). The magnetic field generating device generates a magnetic field B pointing into the plane of drawing in FIG. 3A, indicated by the corresponding symbol.

Figure 3B:
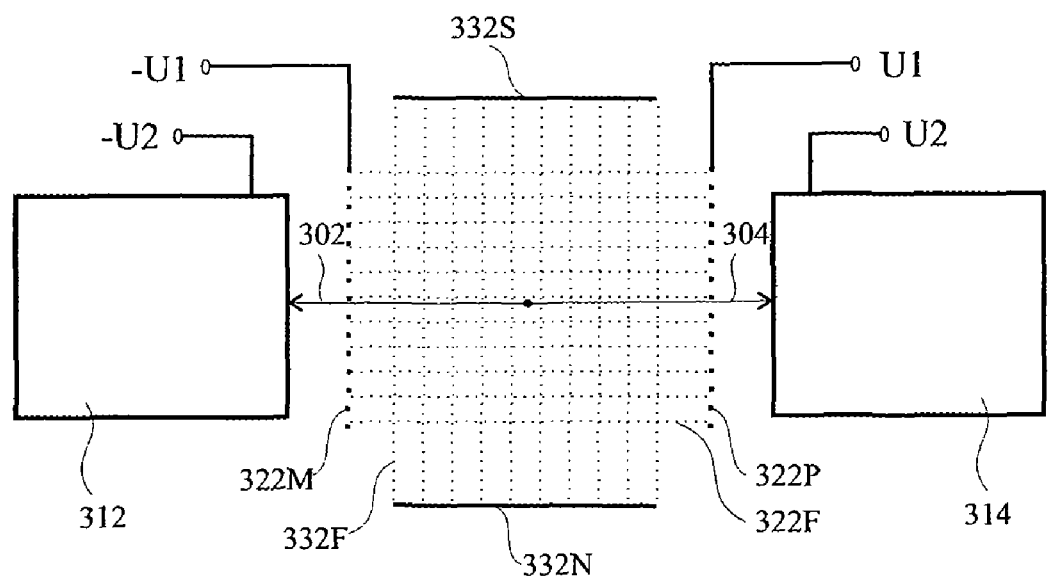
FIGS. 3B shows a top view the detection apparatus of FIG. 3A according to embodiments described herein.

FIG. 3B shows a top view of embodiments of the detection apparatus of FIG. 3A. In FIG. 3B, a magnetic north pole 332N and a magnetic south pole 332S of the magnetic field generating device are shown. The magnetic field B is substantially homogeneous, pointing from the magnetic north pole 332N to the magnetic south pole 332S. As indicated by the schematic field lines 322F of the electrical field and the schematic field lines 332F of the magnetic field, the magnetic field B is substantially orthogonal to the electrical field E, at least in a separation area. The separation field includes or consists of the electric field E and the magnetic field B.

According to some embodiments, the both electrodes are grid electrodes or are other electrodes which are penetrable by charged particles.

Positively charged particles emitted from an origin of charged particles are deflected by both the electrical field E and the magnetic field B towards the first grid electrode 322M, pass the first grid electrode and are accelerated towards the first detector 312. The first detector 312 is biased with a voltage −U2 which is larger in magnitude than the voltage −U1. The first detector 312 is arranged behind the first electrode 322M as seen in the direction of movement of the positively charged particles, i.e., to the left of the first electrode in FIG. 3A.

FIGS. 3A, 3B show an exemplary schematic trajectory 302 of a positively charged particle. According to embodiments, the first detector 312 is shielded from the fields E and B to the right of the first electrode in FIG. 3A. Vice versa, the electrical field between the first electrode 322M and the first detector 312 does not contribute to the separation field to the right of the first electrode in FIG. 3A. Negatively charged particles emitted from an origin of charged particles are deflected by both the electrical field E and the magnetic field B towards the second grid electrode 322P, pass the second grid electrode and are accelerated towards the second detector 314. According to embodiments, the second detector 314 is biased with a voltage U2 which is larger than the voltage U1. The second detector 314 is arranged behind the second electrode 322P as seen in the direction of movement of the negatively charged particles, i.e., to the right of the second electrode in FIG. 3A.

FIGS. 3A, 3B show an exemplary schematic trajectory 304 of a negatively charged particle. According to embodiments, the second detector 314 is shielded from the fields E and B to the left of the second electrode in FIG. 3A. Vice versa, the electrical field between the second electrode 322P and the second detector 314 does not contribute to the separation field to the left of the second electrode in FIG. 3A.

Hence, according to some embodiments, positively charged particles and negatively charged particles are simultaneously deflected, wherein the positively charged particles are deflected towards the first detector and the negatively charged particles are deflected towards the second detector. In further embodiments, the positively and negatively charged particles are detected simultaneously in the first and second detector.

In typical embodiments, the origin of charged particles is an origin of secondary charged particles generated by impingement of a primary particle beam on a sample or specimen. In further typical embodiments, the primary particle beam is a primary charged particle beam such as an ion beam or electron beam. The secondary charged particles may be secondary electrons or secondary ions. In some embodiments, the separation field generating device, e.g. the two electrodes 322M, 322P and the north and south poles 332S, 332P in FIGS. 3A, 3B, generates a separation field that does not substantially influence the primary charged particle beam. For example, the field generating devices in FIGS. 3A, 3B may generate an electrical field E and a magnetic field B which obey a Wien condition with respect to the primary charged particle beam. In alternative embodiments, e.g., for testing or calibration of the detectors and of the separation field generating device, the source or origin of charged particles detected by the detectors may be of a different kind. For example, the source of charged particles may be a source of electrons and/or ions of a defined energy or direction.

Figure 4:
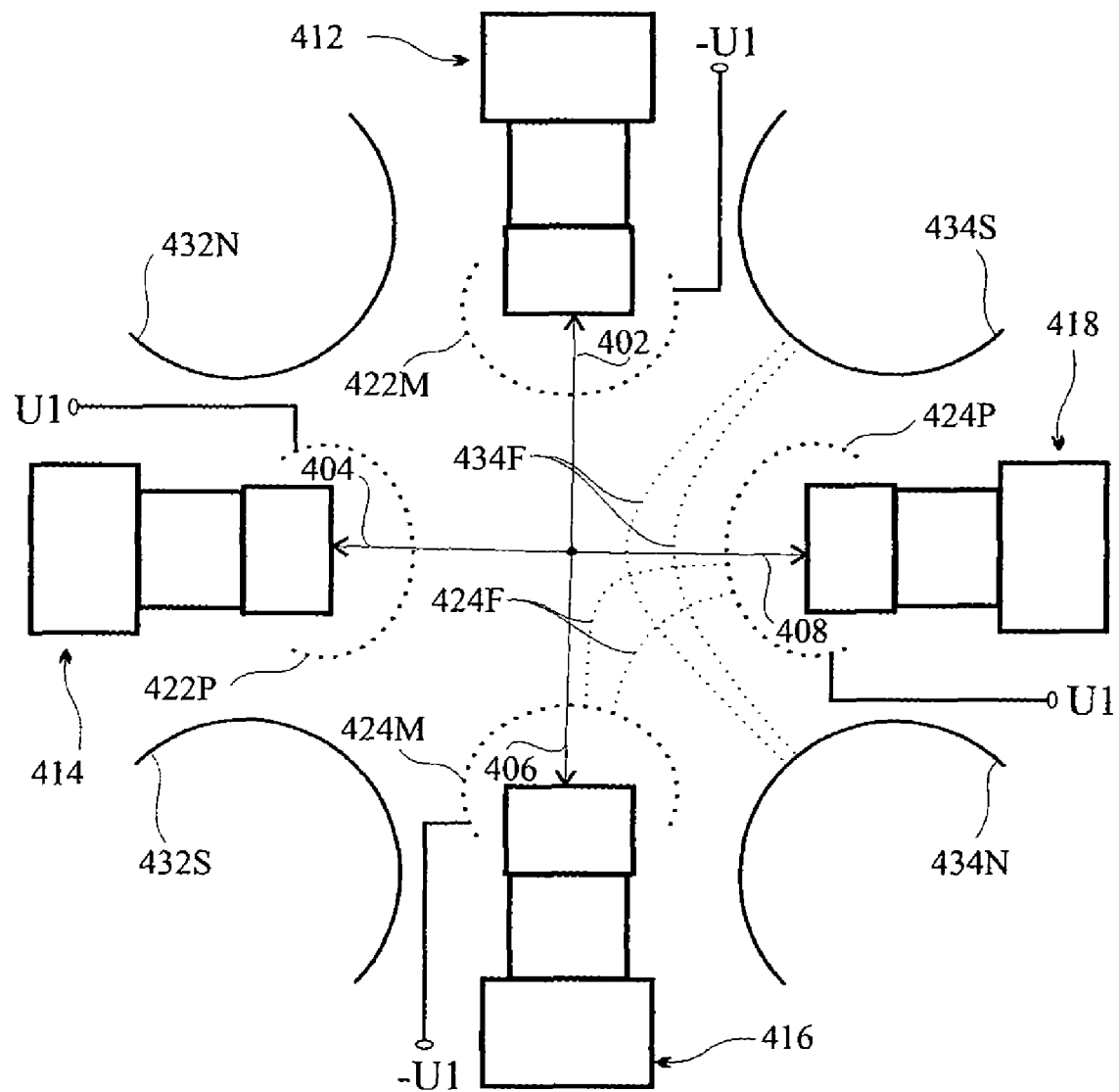
FIG. 4 shows a schematic top view of a detection apparatus according to embodiments described herein.

FIG. 4 shows a top view of further embodiments of a detection apparatus. Only differences with respect to other embodiments are described in detail. Generally, the features of other embodiments described herein can be combined with features shown in FIG. 4.

FIG. 4 shows embodiments of a detection apparatus including four detectors 412, 414, 416, 418 and a separation field generating device which generates an electrical quadrupole field and a magnetic quadrupole field. The separation field generating device includes four electrodes 422P, 422M, 424P, 424M. Therein, electrodes 422P and 424P are biased with a positive voltage U1, and electrodes 422M and 424M are biased with a negative voltage −U1. However, different voltages may be applied to the respective electrodes. The four electrodes are depicted as grid electrodes. According to other embodiments, only two electrodes of different bias may be grid electrodes, e.g., electrodes 422P and 422M.

The separation field generating device may further include a magnetic quadrupole generating device which includes two magnetic south poles 432S and 434S and two magnetic north poles 432N and 434N. The poles may, e.g., be formed by coils and respective pole pieces. According to some embodiments, the electrical quadrupole field is substantially orthogonal to the magnetic quadrupole field, at least in a separation area. In FIG. 4, exemplary schematic field lines 434F of the magnetic quadrupole field and exemplary schematic field lines 424F of the electrical quadrupole field are shown. In such quadrupole configurations, the optical axis is substantially field free. A primary beam travelling along the optical axis may not be influenced at all by the fields.

The four detectors are depicted as similar detectors, e.g., scintillation detectors. Alternatively, the detectors may each be individually designed, e.g. pairwise differing from one another. The detectors may be have bias inputs (not shown) and may be biased to a voltage larger in magnitude than the respective voltages of the grid electrodes which is closest to each respective detector. Typically, a detector near an electrode which is biased with voltage U1 may be biased with a voltage U2 larger than U1, and a detector near an electrode biased with voltage −U1 may be biased with a voltage −U2 larger in magnitude than the voltage −U1. Alternatively, different voltages may be applied.

According to embodiments, negatively charged particles, e.g., negatively charged secondary particles such as secondary electrons are separated from positively charged particles, e.g., positively charged secondary particles such as secondary ions. More specifically, part of the negatively charged particles is deflected towards the electrode 422P and further towards the detector 414, if electrode 422P is transparent for these negatively charged particles. Another part of the negatively charged particles is deflected towards the electrode 424P and further towards the detector 418, if electrode 424P is transparent for these negatively charged particles. Exemplary schematic trajectories 404, 408 of negatively charged particles are shown in FIG. 4. Further, part of the positively charged particles is deflected towards the electrode 422M and further towards the detector 412, if electrode 422M is transparent for these positively charged particles. Another part of the positively charged particles is deflected towards the electrode 424M and further towards the detector 416, if electrode 424M is transparent for these negatively charged particles. Exemplary schematic trajectories 402, 404 of positively charged particles are shown in FIG. 4.

In typical embodiments, the detection apparatus is used in a particle or charged particle beam device such as an ion beam device or focused ion beam device. An origin of charged particles is then formed by secondary charged particles generated by impingement of a primary particle beam on a sample surface or specimen surface. A primary particle beam, specifically a primary charged particle beam, may pass the separation field undeflected or not reshaped or unaltered.

In further embodiments, other numbers of detectors are used, e.g., three, five, or more detectors. These detectors may be of the same kind, be similar or different from each other. The detectors may be biased with the same voltages, but, possibly different polarities, or may be biased with different voltages. According to yet further embodiments various numbers of electrodes or magnetic poles may be used, e.g., respectively 6 or 8, typically to create a hexapole or octupole separation field. All or part of the electrodes may be transparent to charged particles. The electrodes can be biased by voltages of the same magnitude, but, possibly, different signs. Alternatively, the electrodes can be biased by different voltages.

In some embodiments, which can be combined with any embodiments described herein, at least one detector, typically all detectors, include an output portion or signal output. Further, according to embodiments, which can be combined with any embodiments described herein, the detection apparatus includes an evaluation unit. The evaluation unit may include an input portion for receiving signals from at least one detector, typically from all detectors. The output portion of a detector may be connected to the input portion for transmitting a detector signal. The connection can be a cable connection, a wireless connection or any other kind of signal transmission connection.

The evaluation unit may include or consist of a computer, possibly programmed by suitable software. The evaluation unit may alternatively be any other kind of device for evaluating detector signals. Typically, signals from different detectors are evaluated at the same time. In further typical embodiments, which can be combined with any other embodiments described herein, detector signals carry information about a sample or specimen that is to be inspected or imaged. The evaluation unit may include means to pass on the evaluation result, e.g., in form of an electronic signal for use in or control of other devices, or in form of signals communicated to a human. The latter signals may be optical, acoustical, haptic signals, or any combination thereof, transmitted to the human by monitors, loudspeakers, haptic devices, any combination thereof or in any other way.

Figure 5:
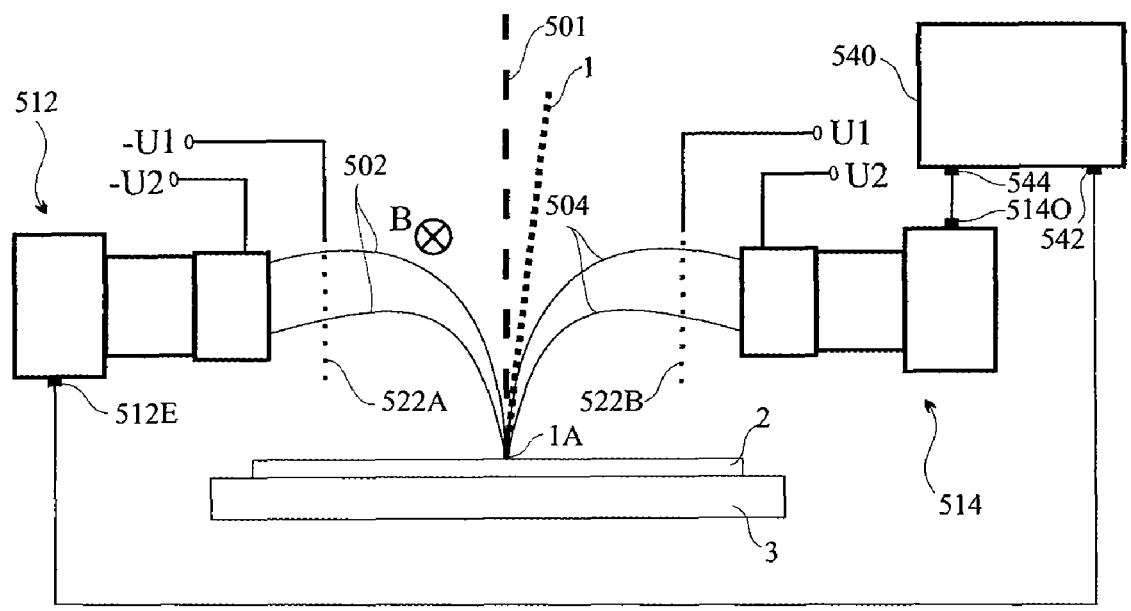
FIG. 5 shows a side view of a part of a charged particle beam device including a detection apparatus according to embodiments described herein.

FIG. 5 shows a side view of a part of a particle beam device according to further embodiments. The particle beam device includes a detection apparatus according to any of the embodiments described herein. FIG. 5 exemplarily shows a charged particle beam device such as an ion beam device including a detection apparatus similar to that of FIG. 3A. Alternatively, e.g., a detection apparatus as shown in FIG. 4 could be included or any other detection apparatus disclosed herein. Specifically, detectors 512, 514 are shown, e.g. scintillation detectors, which may be biased by a voltage −U2, respectively U2. Further, the detection apparatus may as well include penetrable electrodes 522A, 522B generating an electric field E. Not shown are means for generating the magnetic field B indicated by a symbol in FIG. 5.

FIG. 5 further shows a sample 2 or specimen located on, respectively resting on, a working plate 3 or specimen stage.

A primary charged particle beam 1 impinges the sample at a position or area 1A, whereby this position or area 1A is turned into an origin of secondary charged particles. These secondary charged particles are separated by the separation field according to whether they are positively or negatively charged particles and are deflected towards the detector 512, respectively the detector 514. Exemplary trajectories 502 of positively charged secondary particles and exemplary trajectories 504 of negatively charged secondary particles are schematically displayed.

In some embodiments, the negatively charged secondary particles and the positively charged secondary particles are detected simultaneously in the detectors 512 and 514. Typically, as shown in FIG. 5, the detectors 512 and 514 include output portions 512E and 514E. In further typical embodiments, these output portions are connected to an input portion of an evaluation unit 540. In FIG. 5, the input portion includes inputs 542 and 544 connected to the output portions 512E, respectively 514E. The evaluation unit 540 may be of any kind described herein and typically evaluates signals of the detectors 512 and 514 simultaneously for inspecting or imaging the sample 2.

In FIG. 5, the primary charged particle beam 1 passes unaltered through the separation field, which includes or consist of the fields E and B. The primary charged particle beam 1 may define an axis which is parallel to the optical axis of the detection apparatus or of the charged particle beam device. The fields E and B may be orthogonal fields obeying a Wien condition with respect to characteristics of the primary charged particle beam. Alternatively, the primary charged particle beam 1 may define an axis which forms an angle with respect to the optical axis of the detection apparatus or of the charged particle beam device. Especially in this case, the fields E and/or B may be tuned to a mismatch of the Wien condition to allow for an unaltered passage of the primary charged particle beam. In other embodiments, the working plate 3 and the sample 2 may be tilted with respect to the horizontal direction. The primary charged particle beam 1 may then impinge under an angle even if it travels along the optical axis of the detection apparatus or along the optical axis of the charged particle beam device. In such situations, one may define "impingement under an angle" as an impingement that is not parallel to the normal of the sample surface (or the normal to a surface area larger by at least an order of magnitude than the structures on the sample surface that are to be inspected). Hence, an impingement angle, or "landing angle", may be from 0° to 45°, typically from 0° to 20°.

Figures 6A, 6B:
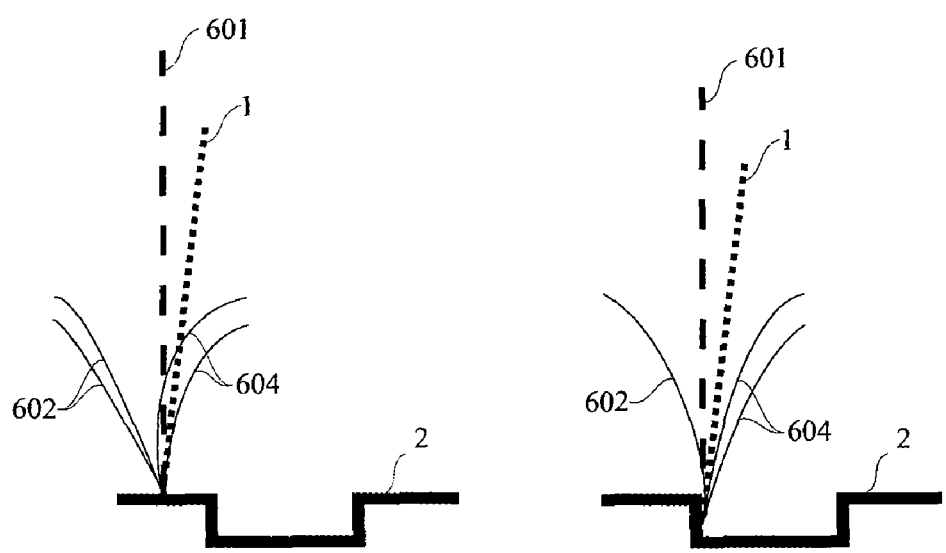
FIG. 6A shows a side view of a sample surface and a primary charged particle beam according to embodiments described herein.
FIG. 6B shows a side view of a sample surface and a primary charged particle beam according to embodiments described herein.

FIG. 6A exemplarily shows the impingement of a charged particle beam 1 onto a sample surface 2. A particular structure on the surface, namely a well, is shown, which is depicted unproportionally large for illustration. The charged particle beam 1 impinges under an angle to an optical axis 601, respectively normal to the sample surface, as explained with respect to FIG. 5. Thereby, a distribution of velocities and corresponding velocity directions results that is different from the distribution obtained by an impingement without angle, i.e., parallel to the optical axis 601.

As shown in FIG. 6B, an impingement of the primary charged particle beam 1 under an angle may help in the inspection or imaging of structures such as the side walls of a well structure. Such structures might not be clearly discerned by detecting secondary particles generated from a primary particle beam impinging without angle.

Further, exemplary trajectories 602 of positively charged secondary particles and exemplary trajectories 604 of negatively charged secondary particles are shown in FIG. 6A and 6B. These trajectories depend on the structure that is inspected or imaged, and may also depend on the charge of the secondary charged particles. Hence, by simultaneous detection of both positively and negatively charged secondary particles, more information about the sample surface may be obtained as compared to a detection of only one type of charged particles or even as compared to a sequential detection of both types, in which a single detector is reconfigured (possibly along with the separation field).

Typically, secondary particles are emitted into the whole hemisphere above the sample surface, unless the sample surface hinders emission into certain solid angles. Generally, according to embodiments with landing angle or according to embodiments without landing angle (perpendicular impingement on a sample surface), increased information about the sample surface may be obtained by detecting particles in more than one direction. Particles detected in more than one direction may be particles of different charge or of the same charge. For example by adjusting the separation field, particles emitted with different polar angle but substantially the same azimuth angle may be detected in one detector. According to some embodiments, two or more detectors may be used to simultaneously detect particles emitted with different azimuth angles. In embodiments described herein, the sample and/or the detection apparatus are rotated changing the relative azimuth angle. Information from particle characteristics, including the presence or the absence of particles, may be obtained over the whole hemisphere.

According to embodiments illustrated in FIG. 4, two detectors 412 and 416 simultaneously detect positively charged particles emitted in directions with substantially opposite azimuth angle ($\phi$ and $\phi+\pi$), and two detectors 414 and 418 simultaneously detect negatively charged particles emitted with substantially opposite azimuth angle ($\phi+\pi/2$ and $\phi+3\pi/2$). In some embodiments, $\phi$ is varied, e.g. by rotating the detection apparatus or the origin of the charged particles, typically a sample surface. According to embodiments described herein, the separation field is changed to detect particles emitted in a different range of polar angles ($\theta$).

According to embodiments, which can be combined with any embodiments described herein, the detection apparatus includes at least one detector aperture. For example, a detector aperture may be a device with an opening, e.g. an electrode with an opening. The detector aperture can filter charged particles according to a particle characteristic. Such a characteristic can be energy, velocity, direction, angle or any other physical property of charged particles. Here, a characteristic such as energy may also mean a parameter range such as an energy range. Only charged particles of the right characteristic can pass the filter and reach the detector. Thereby, a selective detection and gathering of information is enabled, e.g., an energy sensitive detection and/or angle sensitive detection.

Figure 7:
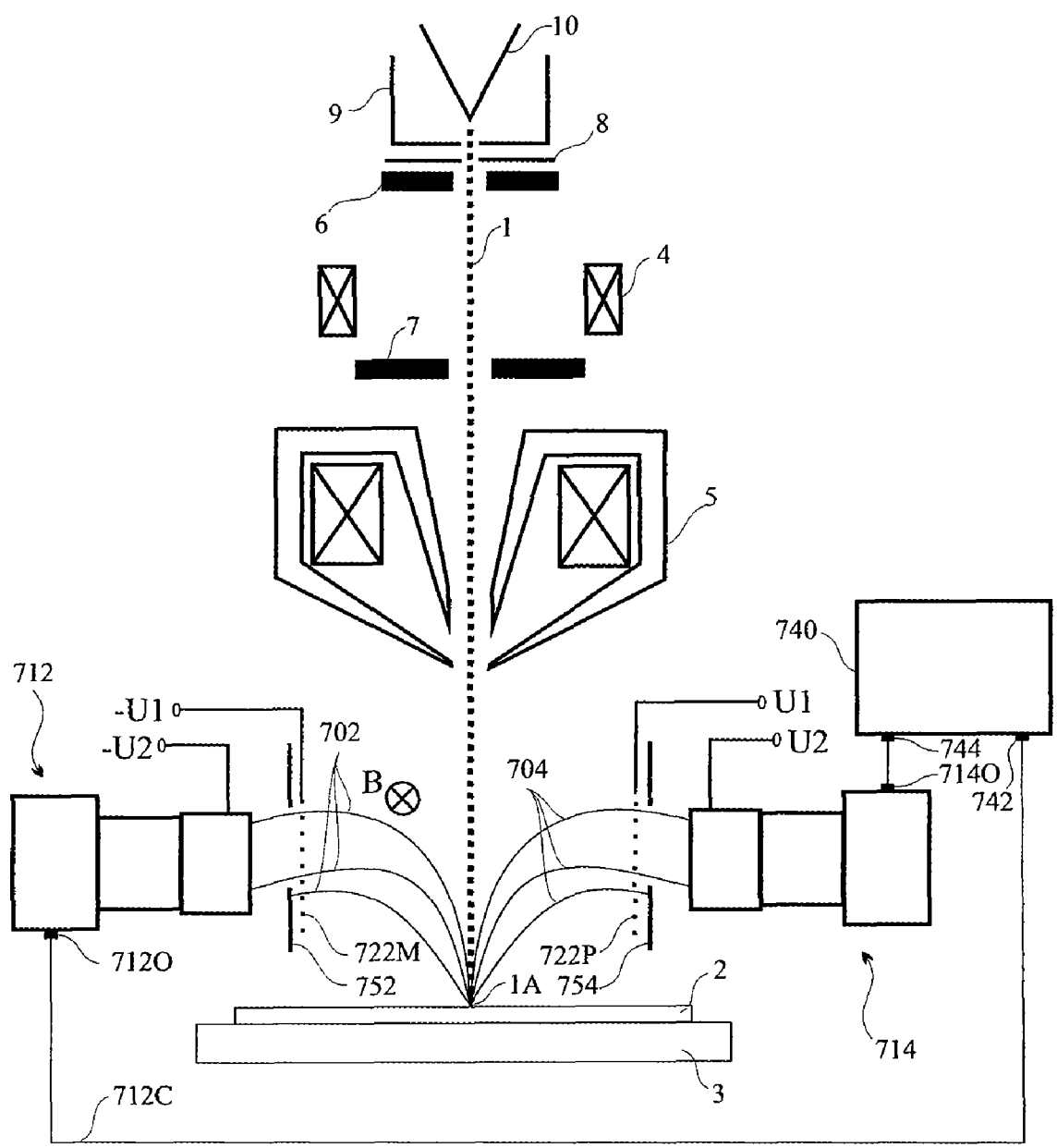
FIG. 7 shows a side view of a charged particle beam device including a detection apparatus according to embodiments described herein.

FIG. 7 shows a charged particle beam device according to embodiments described herein. The charged particle device includes a primary charged particle beam source. According to embodiments, which can be combined with other embodiments described herein, a primary charged particle beam is an ion beam. In some embodiments, the ions in the primary ion beam are one kind of light ions or a mixture of light ions, e.g. hydrogen or helium. Light ions are typically used for imaging a sample. In some embodiments, the ions in the primary ion beam are of a mixture of light ions, e.g. hydrogen or helium and heavier ions like Argon whereby the lighter ions can be used for imaging while the heavier ones are used for etching. In some embodiments, the ions in the primary ion beam are ions of one kind of a noble gas or of a mixture of noble gases, e.g. He, Ne, Ar. Ions of the noble gases, in particular the heavier noble gases, may be used for modification of a sample surface.

As shown in FIG. 7, the primary charged particle beam source may include a beam emitter 10, a suppressor electrode 9 (or a Wehnelt grid), an extractor 8, and an electrode 6, e.g. an acceleration electrode. In some embodiments, which can be combined with other embodiments described herein, the primary charged particle beam source is a gas field ion source. According to embodiments shown in FIG. 7, the charged particle device includes an aperture 7, a condenser 4, and an objective lens 5. Alternatively, the charged particle device may be any other charged particle device of similar or different design. FIG. 7 also shows a primary charged particle beam 1 emitted by beam emitter 10, which is shaped by the beam shaping components, especially by the condenser 4, the aperture 7 and the objective lens 5. Hence, the charged particle beam device shown in FIG. 7 is a focused charged particle beam device, e.g., a focused ion beam device. The primary charged particle beam impinges on a position or area 1A of the sample surface. The sample or specimen 2 is located on or rests on a sample holder 3, e.g. a working plate or specimen stage. By impingement, secondary charged particles are provided.

According to some embodiments, the charged particle beam device further includes a detection apparatus. The detection apparatus may be a detection apparatus according to any embodiments disclosed herein. In FIG. 7, a detection apparatus similar to that of FIG. 5 is shown. The detection apparatus includes a first detector 712, a second detector 714, a first electrode 722M, a second electrode 722P and a magnetic field generating device (not shown). Further, the detectors have output portions 712E, 714E connected via connection means 712C to inputs 742, 744 of an evaluation unit 740.

The detection apparatus shown in FIG. 7 also includes, according to further embodiments, a first detector aperture 752 and a second detector aperture 754.

In some embodiments, an aperture is arranged between the detector and the electrode. With this arrangement, the aperture does not influence the separation field. In alternative embodiments, the aperture is not arranged between the detector and the electrode. An aperture may be a device with an opening, e.g. a circular or rectangular opening. For example, an aperture may be a plate with a hole, e.g. electrode adapted to be biased with a voltage. An aperture may filter the charged particles according to a particle characteristic, e.g. energy or angle.

In some embodiments, e.g., the apertures 752 and 754 are arranged between the detector 712 and the electrode 722M, respectively between the detector 714 and the electrode 722P as shown in FIG. 7. The apertures 752, 754 filter the charged particles according to a particle characteristic, e.g. energy or angle. The filtering is illustrated with exemplary schematic particle trajectories 702 and 704.

According to further embodiments, the charged particle beam device may include beam directing components. In some embodiments, all or part of the beam shaping components may also represent all or part of the beam directing components. In other embodiments, there are further beam directing components, such as further beam deflecting devices. Beam deflecting components may be controlled by one or more deflection controllers, e.g., a computer programmed by suitable software. According to further embodiments, the charged particle beam may be directed to different impingement positions or areas on the sample. For example, beam directing components may direct the charged particle beam over the sample in a line-by-line scanning manner or may direct the beam to random positions or direct the beam according to any other pattern or in any other way. Thereby, a full or partial inspection or imaging of the sample is enabled.

The arrangement of components may differ from the arrangement shown in FIG. 7. For example, the objective lens may be arranged between the detection apparatus and the sample.

Further, embodiments relate to methods of operating a detection apparatus and to methods of operating a charged particle beam device according to any of the embodiments described herein. Further embodiments relate to the use of a detection apparatus according to any of the embodiments disclosed herein. Typical further embodiments relate to the use of such a detection apparatus in a charged particle beam device, typically for inspection and or imaging of samples or specimens.

Embodiments described herein relate to a method of detecting negatively and positively charged particles, typically secondary negatively and positively charged particles. In particular, embodiments relate to method of simultaneously detecting negatively and positively charged secondary particles, typically in a primary charged particle beam application for sample imaging or sample inspection. According to some embodiments, negatively and positively charged particles are provided. In typical embodiments, negatively and positively charged secondary particles are provided, e.g. generated by impingement of a primary particle beam on a sample.

Generally, a separation field is provided. The separation field may be an electrical field, a magnetic field, a combination thereof, or any other field influencing charged particles. According to typical embodiments, the separation field includes or consists of a combination of an electrical field and a magnetic field. The electrical and magnetic field may be orthogonal to each other, at least in a separation area. In some embodiments, the electrical and magnetic field obey a Wien condition with respect to a primary charged particle beam, which typically passes the fields undeflected. In other embodiments the electrical and magnetic field do not obey a Wien condition, at least not strictly, especially if a primary charged particle beam passes the separation field under an angle different from 90° with respect to the field lines of the electrical and magnetic field, e.g., to impinge a sample under an angle such as a tilted landing angle.

According to an aspect, a first and a second detector are provided. Detectors may be any detectors for detecting charged particles, e.g., scintillation detectors, pin diode detectors, channeltron detectors, or channel plate detectors. Further, in some embodiments, the detectors are biased. Therein, some detectors may be biased with a positive voltage, while others may be biased with a negative voltage. The magnitude of the voltages applied to the detectors may all be the same. Alternatively, the voltages may differ.

In the separation field, according to further embodiments, negatively and positively charged particles, typically negatively and positively charged secondary particles are separated from each other. According to some embodiments, the negatively charged particles are deflected towards the first detector while, at the same time, the positively charged particles are deflected towards the second detector.

According to some embodiments, the negatively charged particles or a part thereof are filtered. Positively charged particles or a part thereof may, additionally or alternatively, be filtered. Therefore, at least one aperture or other filtering device may be provided.

In embodiments described herein, negatively and positively charged particles, e.g. secondary electrons and secondary ions, are simultaneously detected, wherein the negatively charged particles are detected with the first detector and the positively charged particles are detected with the second detector.

According to embodiments, the detector output is evaluated. Typically, the detector output of the detectors is simultaneously evaluated. An evaluation unit may be provided, e.g., a computer possibly programmed by dedicated software. The detector output may be processed by the evaluation unit, e.g., to create an image of a sample or to generate signals for further processing of the sample.

Embodiments described herein relate to a method of imaging a sample or inspecting a sample, typically in a primary charged particle beam application. The method includes providing a sample, e.g., a semiconductor wafer or other specimen. According to some embodiments, a primary particle beam is provided. In typical embodiments, a primary charged particle beam is provided. Further, typically, a position on the sample is chosen, which is to be inspected or imaged. The primary charged particle beam impinges on the sample at the chosen position. Thereby, secondary charged particles are generated.

The secondary charged particles may be detected using any of the features of methods described herein, or any combination thereof, yielding further embodiments.

According to some embodiments, the detector output of the detectors is evaluated for imaging or inspection of the sample. According to other embodiments, the detector output or the evaluation of the detector output is used for choosing another spot or position on the sample for imaging or inspection. In yet other embodiments, another spot on the sample is chosen according to a pattern, e.g., line-by-line scanning, raster scanning, vector scanning, interlaced scanning, or is chosen randomly or in any other manner. Thereupon, the primary particle beam is directed to the newly chosen spot, secondary charged particles are generated, and the detection of secondary particles may be repeated in any way described herein or in any other way.

According to further embodiments, the information gathered by imaging or inspecting the sample is used for further processing of the sample.

While the foregoing is directed to embodiments, other and further embodiments may be devised without departing from the basic scope, and the scope is determined by the claims that follow.

The invention claimed is:

1. Detection apparatus for use in a charged particle beam device and for simultaneous detection of negatively and positively charged particles, the detection apparatus comprising:
 a separation field generating portion adapted to generate a separation field separating secondary positively and negatively charged particles;
 at least one first detector for detecting positively charged particles; and
 at least one second detector for detecting negatively charged particles, wherein the detection apparatus is adapted to simultaneously detect the positively charged particles in the at least one first detector and the negatively charged particles in the at least one second detector, and wherein the separation field generating portion comprises:
  an electrical field generating portion adapted to generate an electrical field; and
  a magnetic field generating portion adapted to generate a magnetic field that is substantially orthogonal to the electrical field at least in a separation area.

2. Detection apparatus according to claim 1, wherein the magnetic field is substantially one of a homogeneous field, a dipole field, a quadrupole field, or a higher multipole field.

3. Detection apparatus according to claim 1, wherein the electrical field is substantially one of a homogeneous field, a dipole field, a quadrupole field, or a higher multipole field.

4. Detection apparatus according to claim 1, wherein the separation field generating portion comprises:
 a first electrode at least partially penetrable by the positively charged particles, the first electrode adapted to be biased with a negative voltage; and
 a second electrode at least partially penetrable by the negatively charged particles, the second electrode adapted to be biased with a positive voltage.

5. Detection apparatus according claim 1, further comprising at least one of the following:
 a detector aperture of the at least one first detector adapted to filter the positively charged particles according to a particle characteristic; and
 a detector aperture of the second detector adapted to filter the negatively charged particles according to a particle characteristic.

6. Detection apparatus according to claim 1, further comprising:
 an evaluation unit for evaluating output of the at least one first detector or of the at least one second detector or of the at least one first and the at least one second detector, wherein the at least one first detector comprises an output portion for transmitting output to the evaluation unit, and/or the at least one second detector comprises an output portion for transmitting output to the evaluation unit, and wherein the evaluation unit comprises an input portion for receiving output from the output portion of the at least one first detector and/or from the output portion of the at least one second detector.

7. Charged particle beam device, comprising a detector system, the detector system comprising:
 a separation field generating portion adapted to generate a separation field separating secondary positively and negatively charged particles;
 at least one first detector for detecting positively charged particles; and
 at least one second detector for detecting negatively charged particles, wherein the detection apparatus is adapted to simultaneously detect the positively charged particles in the at least one first detector and the negatively charged particles in the at least one second detector, and wherein the separation field generating portion comprises:
  an electrical field generating portion adapted to generate an electrical field; and
  a magnetic field generating portion adapted to generate a magnetic field that is substantially orthogonal to the electrical field at least in a separation area, the charged particle beam device further comprising:
 a primary charged particle beam source for generating a primary charged particle beam; and
 a sample holder for holding a sample.

8. Charged particle beam device according to claim 7, wherein the separation field is further adapted to let the primary charged particle beam pass undeflected.

9. Charged particle beam device according to claim 7, further comprising beam shaping portion for shaping and/or deflecting the primary charged particle beam, the beam shaping portion being adapted to influence an impingement angle and/or an impingement spot.

10. Charged particle beam device according to claim 7, wherein the primary charged particle beam source comprises a gas field ion source.

11. Charged particle beam device according to claim 7, wherein the primary charged particle beam is an ion beam comprising ions of matter selected from the group consisting of hydrogen, helium, neon, argon, krypton, xenon and mixtures thereof.

12. Charged particle beam device according to claim 7, wherein the magnetic field is substantially one of a homogeneous field, a dipole field, a quadrupole field or a higher multipole field.

13. Charged particle beam device according to claim 7, wherein the electrical field is substantially one of a homogeneous field, a dipole field, a quadrupole field or a higher multipole field.

14. Charged particle beam device according to claim 7, wherein the detection apparatus further comprises at least one of the following:
- a detector aperture of the at least one first detector adapted to filter the positively charged particles according to a particle characteristic; and
- a detector aperture of the at least one second detector adapted to filter the negatively charged particles according to a particle characteristic.

15. Method for simultaneously detecting secondary negatively and positively charged particles in a charged particle beam application, the method comprising:
- separating secondary negatively charged particles from secondary positively charged particles in a separation field, wherein the separation field comprises an electrical field and a magnetic field that is substantially orthogonal to the electrical field at least in a separation area; and
- simultaneously detecting secondary positively charged particles with at least one first detector and secondary negatively charged particles with at least one second detector.

16. Method for simultaneously detecting secondary negatively and positively charged particles according to claim 15, wherein the electrical field is one of a homogeneous field, a dipole field, a quadrupole field or a higher multipole field.

17. Method for simultaneously detecting secondary negatively and positively charged particles according to claim 15, wherein the magnetic field is one of a homogeneous field, a dipole field, a quadrupole field or a higher multipole field.

18. Method for simultaneously detecting secondary negatively and positively charged particles according to claim 15, further comprising filtering particles according to at least one particle characteristic, the particles comprising at least one of secondary negatively charged particles and secondary positively charged particles.

19. Method for simultaneously detecting secondary negatively and positively charged particles according claim 15, further comprising evaluating a detector output of the at least one first detector and of the at least one second detector.

20. Method for imaging a sample, the method comprising:
a method for detecting secondary negatively and positively charged particles, comprising:
- separating secondary negatively charged particles from secondary positively charged particles in a separation field, wherein the separation field comprises an electrical field and a magnetic field that is substantially orthogonal to the electrical field at least in a separation area; and
- simultaneously detecting secondary positively charged particles with at least one first detector and secondary negatively charged particles with at least one second detector, the method for imaging a sample further comprising:
providing a sample; and
providing a primary charged particle beam, wherein the secondary negatively and positively charged particles are provided by impingement of the primary charged particle beam on the sample.

21. Method for imaging a sample according to claim 20, wherein the primary charged particle beam passes the separation field undeflected.

22. Method for imaging a sample according to claim 20, wherein the primary charged particle beam impinges the sample with an impingement angle from 0° to 45°.

23. Method for imaging a sample according to claim 20, wherein the primary charged particle beam is an ion beam comprising ions of matter selected from the group consisting of hydrogen, helium, neon, argon, krypton, xenon and mixtures thereof.

* * * * *